US012783898B2

(12) United States Patent
Yoon

(10) Patent No.: US 12,783,898 B2
(45) Date of Patent: Nov. 3, 2026

(54) XOR OPERATION LEARNING PROBABILITY OF MULTIVARIATE NONLINEAR ACTIVATION FUNCTION AND PRACTICAL APPLICATION METHOD THEREOF

(71) Applicant: IUCF-HYU (INDUSTRY-UNIVERSITY COOPERATION FOUNDATION HANYANG UNIVERSITY), Seoul (KR)

(72) Inventor: Kijung Yoon, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 946 days.

(21) Appl. No.: 18/163,542

(22) Filed: Feb. 2, 2023

(65) Prior Publication Data

US 2023/0252303 A1 Aug. 10, 2023

(30) Foreign Application Priority Data

Feb. 8, 2022 (KR) ........................ 10-2022-0016415

(51) Int. Cl.

| | |
|---|---|
| ***G06N 3/092*** | (2023.01) |
| ***G06N 3/048*** | (2023.01) |
| ***G06N 3/0499*** | (2023.01) |

(52) U.S. Cl.
CPC ............. *G06N 3/092* (2023.01); *G06N 3/048* (2023.01); *G06N 3/0499* (2023.01)

(58) Field of Classification Search
CPC ...... G06N 3/092; G06N 3/048; G06N 3/0499; G06N 3/045; G06N 3/0464; G06N 3/08; G06N 3/084
See application file for complete search history.

(56) References Cited

U.S. PATENT DOCUMENTS

| | | | | |
|---|---|---|---|---|
| 10,761,897 | B2 * | 9/2020 | LaBute | H04L 41/145 |
| 11,636,348 | B1 * | 4/2023 | Tang | G06N 7/01 706/16 |
| 12,380,318 | B2 * | 8/2025 | Liu | G06N 3/045 |
| 12,566,942 | B2 * | 3/2026 | Bingham | G06N 3/04 |
| 2017/0323636 | A1 * | 11/2017 | Xiao | G06F 40/30 |
| 2022/0414542 | A1 * | 12/2022 | Biadsy | G06N 5/022 |

(Continued)

OTHER PUBLICATIONS

Mirko Solazzi et al., "Regularising neural networks using flexible multivariate activation function", Neural Networks, 2004, vol. 17, pp. 247-260 (14 pages total).

(Continued)

*Primary Examiner* — Omar F Fernandez Rivas
(74) *Attorney, Agent, or Firm* — Sughrue Mion, PLLC

(57) ABSTRACT

Disclosed are an exclusive OR (XOR) operation learning probability of a multivariate nonlinear activation function and a practical application method thereof. A learning method of an activation function performed by a computer device may include constructing an inner network using a multivariate nonlinear activation function; and training a combination model generated by merging the constructed inner network and an outer network.

9 Claims, 26 Drawing Sheets

Inner network (2-arg input)

Outer network + Inner network

(56) References Cited

U.S. PATENT DOCUMENTS

| | | | | |
|---|---|---|---|---|
| 2023/0229904 | A1* | 7/2023 | Santhar | G06V 10/776 706/15 |
| 2023/0252303 | A1* | 8/2023 | Yoon | G06N 3/048 706/25 |

OTHER PUBLICATIONS

Office Action issued Mar. 21, 2025 in Korean Patent Application No. 10-2022-0016415.

* cited by examiner

Activation function

Model architecture

Outer network + ReLU

Activation function

Inner network (2-arg input)

Model architecture

Outer network + Inner network

XOR OPERATION LEARNING PROBABILITY OF MULTIVARIATE NONLINEAR ACTIVATION FUNCTION AND PRACTICAL APPLICATION METHOD THEREOF

CROSS-REFERENCE TO RELATED APPLICATION

This application claims the priority benefit of Korean Patent Application No. 10-2022-0016415, filed on Feb. 8, 2022, in the Korean Intellectual Property Office, the disclosure of which is incorporated herein by reference.

BACKGROUND

1. Field of the Invention

The following description of example embodiments relates to learning technology of an activation function.

2. Description of the Related Art

Neurons in the brain are not simply linear filters followed by a half-wave rectification and exhibit properties, such as divisive normalization, coincidence detection, and history dependency. Instead of fixed canonical nonlinear activation functions such as sigmoid, tanh, and rectified linear unit (ReLU), other nonlinear activation functions may be more realistic and more useful.

In particular, interest in a multivariate nonlinear activation function is emerging. Here, arguments may correspond to inputs that arise from a plurality of distinct pathways, such as feedforward and lateral or feedback connections, or from different dendritic compartments. The multivariate nonlinear activation function may allow one feature to modulate processing of other features.

Recent work shows that a single dendritic compartment of a single neuron may compute an exclusive OR (XOR) operation. The fact that an artificial neuron might not compute this basic computational operation discredited neural networks for decades. Although XOR may be computed by networks of neurons, the finding highlight the probability that even individual neurons may be more sophisticated than often assumed in machine learning. Many single-variate nonlinear activation functions allow universal computation, but there is a need for technology that may allow faster learning and better generalization for both the brain and artificial networks.

SUMMARY

Example embodiments may provide a method and apparatus that may implement a multivariate nonlinear activation function and may construct an inner network using the implemented multivariate nonlinear activation function.

Example embodiments may provide a method and apparatus that may train a combination model in which an inner network using a multivariate nonlinear activation function is merged with an arbitrary outer network.

According to an aspect of at least one example embodiment, there is provided a learning method of an activation function performed by a computer device, the method including constructing an inner network using a multivariate nonlinear activation function; and training a combination model generated by merging the constructed inner network and an outer network.

The constructing of the inner network may include constructing the inner network by modeling the multivariate nonlinear activation function using a multilayer perceptron (MLP) having a plurality of input arguments and at least one output terminal.

The constructing of the inner network may include constructing the inner network using a convolution with a preset size.

The training may include merging the constructed inner network and the outer network by providing the constructed inner network between hidden layers of the outer network.

The training may include merging the constructed inner network and the outer network through a slice and concatenation operation from a depth dimension of the inner network.

The training may include pretraining the inner network using supervised learning on the multivariate nonlinear activation function.

The training may include simultaneously training the inner network and the outer network to generate the combination model by merging the pretrained inner network and the outer network through parameter sharing.

The training may include fixing the trained inner network and then initializing the trained outer network, and retraining the initialized outer network.

According to an aspect of at least one example embodiment, there is provided a non-transitory computer-readable recording medium storing a computer program to perform the learning method of the activation function on the computer device.

According to an aspect of at least one example embodiment, there is provided a computer device including an inner network constructor configured to construct an inner network using a multivariate nonlinear activation function; and a model trainer configured to train a combination model generated by merging the constructed inner network and an outer network.

The inner network constructor may be configured to construct the inner network by modeling the multivariate nonlinear activation function using a multilayer perceptron having a plurality of input arguments and at least one output terminal.

The inner network constructor may be configured to merge the constructed inner network and the outer network by providing the constructed inner network between hidden layers of the outer network.

The model trainer may be configured to pretrain the inner network using supervised learning on the multivariate nonlinear activation function.

The model trainer may be configured to simultaneously train the inner network and the outer network to generate the combination model by merging the pretrained inner network and the outer network through parameter sharing.

The model trainer may be configured to fix the trained inner network and then initialize the trained outer network, and retrain the initialized outer network.

According to some example embodiments, since a pattern of a soft exclusive OR (XOR) function is verified through results of analyzing a pattern of a multivariate nonlinear activation function learned from an inner network, it is possible to estimate that a single neuron in the brain may act as a significantly complex nonlinear function.

According to some example embodiments, an architecture of an inner network configured with a multivariate nonlinear activation function may be more robust against a variety of noise and adversarial attacks.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, example embodiments will be described with reference to the accompanying drawings.

Figure 1:
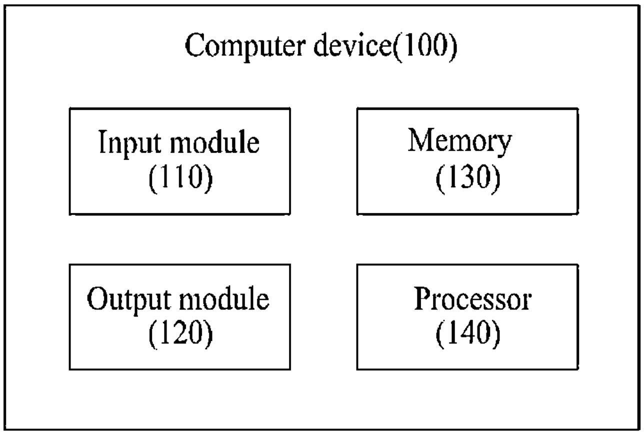
FIG. 1 is a diagram illustrating an example of a configuration of a computer device according to an example embodiment.

FIG. 1 is a diagram illustrating an example of a configuration of a computer device according to an example embodiment.

Referring to FIG. 1, a computer device 100 may include at least one of an input module 110, an output module 120, a memory 130, and a processor 140. In some example embodiments, at least one of components of the computer device 100 may be omitted and at least one another component may be added. In some example embodiments, at least two components among the components of the computer device 100 may be implemented as a single integrated circuit.

The input module 110 may input a signal to be used for at least one component of the computer device 100. The input module 110 may include at least one of an input device configured for a user to directly input a signal to the computer device 100, a sensor device configured to sense am ambient change and to generate a signal, and a reception device configured to receive a signal from an external device. For example, the input device may include at least one of a microphone, a mouse, and a keyboard. In some example embodiments, the input device may include at least one of a touch circuitry set to sense a touch and a sensor circuitry set to measure intensity of force generated by the touch. Here, the input module 110 may include a photoplethysmogram (PPG) sensor.

The output module 120 may output information to the outside of the computer device 100. The output module 120 may include at least one of a display device configured to visually output information, an audio output device capable of outputting information using an audio signal, and a transmission device capable of wirelessly transmitting the information. For example, the display device may include at least one of a display, a hologram device, and a projector. For example, the display device may be implemented as a touchscreen through assembly to at least one of the touch circuitry and the sensor circuitry of the input module 110.

For example, the audio output device may include at least one of a speaker and a receiver.

According to some example embodiments, the reception device and the transmission device may be implemented as a communication module. The communication module may perform communication with the external device in the computer device 100. The communication module may establish a communication channel between the computer device 100 and the external device and may communicate with the external device through the communication channel. Here, the external device may include at least one of a vehicle, a satellite, a base station, a server, and another computer system. The communication module may include at least one of a wired communication module and a wireless communication module. The wired communication module may communicate with the external device in a wired manner through wired-connection to the external device. The wireless communication module may include at least one of a short-distance communication module and a long-distance communication module. The short-distance communication module may communicate with the external device through a short-distance communication method. For example, the short-distance communication method may include at least one of Bluetooth, wireless fidelity (WiFi) direct, and an infrared data association (IrDA). The long-distance communication module may communicate with the external device through a long-distance communication method. Here, the long-distance communication module may communicate with the external device over a network. For example, the network may include at least one of a cellular network, the Internet, and a computer network such as a local area network (LAN) and a wide area network (WAN).

The memory 130 may store a variety of data used by at least one component of the computer device 100. For example, the memory 130 may include at least one of a volatile memory and a nonvolatile memory. Data may include at least one program and input data or output data related thereto. The program may be stored in the memory 130 as software that includes at least one instruction and may include at least one of an operating system (OS), middle ware, and an application.

The processor 140 may control at least one component of the computer device 100 by executing the program of the memory 130. Through this, the processor 140 may perform data processing or operation. Here, the processor 140 may execute the instruction stored in the memory 130.

According to various example embodiments, the processor 140 may be configured to train a combination model by merging an inner network constructed using a multivariate nonlinear activation function with an arbitrary outer network. Description related to such a processor is made with reference to FIGS. 2 and 3.

Figure 2:
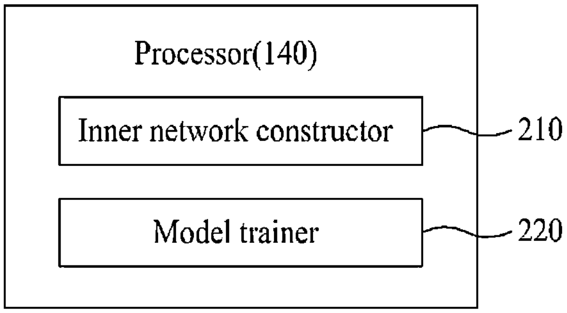
FIG. 2 is a diagram illustrating an example of a configuration of a processor according to an example embodiment.
Figure 3:
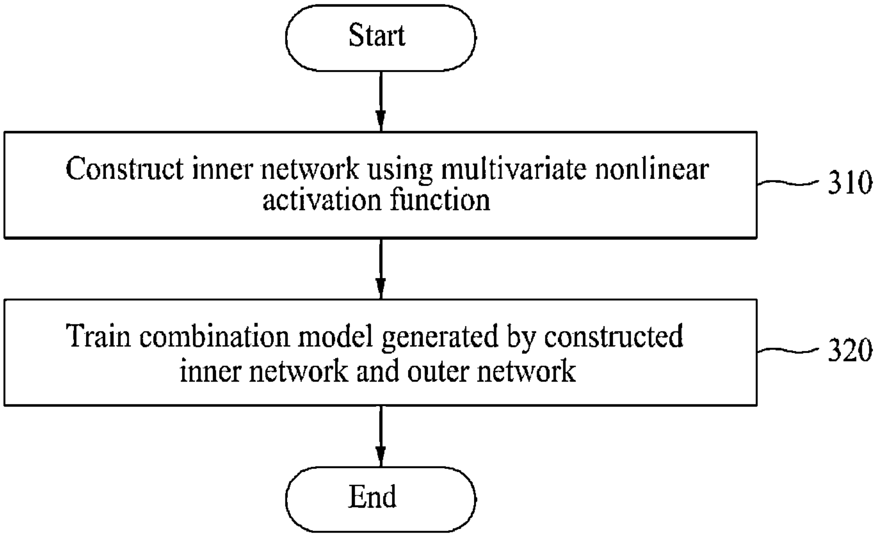
FIG. 3 is a flowchart illustrating an example of a learning method of a nonlinear activation function according to an example embodiment.

FIG. 2 is a diagram illustrating an example of a configuration of a processor according to an example embodiment, and FIG. 3 is a flowchart illustrating an example of a learning method of a nonlinear activation function according to an example embodiment.

The processor 140 of the computer device 100 may include at least one of an inner network constructor 210 and a model trainer 220. The components of the processor 140 may be representations of different functions performed by the processor 140 in response to a control instruction provided from a program code stored in the computer device 100. The processor 140 and the components of the processor 140 may control the computer device 100 to perform operations 310 and 320 included in the learning method of the nonlinear activation function of FIG. 3. Here, the processor 140 and the components of the processor 140 may be implemented to execute an instruction according to a code of at least one program and a code of an OS included in the memory 130.

The processor 140 may load a program code stored in a file of the program for the learning method of the nonlinear activation function to the memory 130. For example, when the program is executed in the computer device 100, the processor 140 may control the computer device 100 to load the program code from the file of the program to the memory 130. Here, the inner network constructor 210 and the model trainer 220 may be different functional representations of the processor 140 to perform operations 310 and 320 by executing an instruction of a portion corresponding to the program code loaded to the memory 130.

Figure 4:
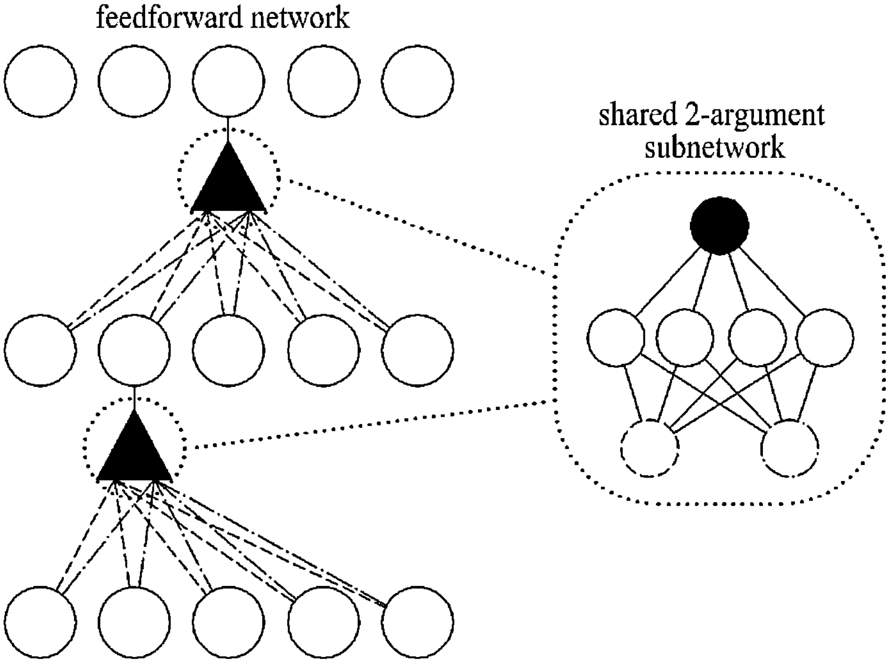
FIG. 4 illustrates an example of a concept of a multivariate nonlinear activation function according to an example embodiment.

In operation 310, the inner network constructor 210 may construct an inner network using a multivariate nonlinear activation function. Initially, the concept of the multivariate nonlinear activation function is described with reference to FIG. 4. FIG. 4 illustrates a nonlinear activation function (triangle) that connects neurons (circles) and neurons. Nonlinear input-output transformation may be flexibly parameterized by the inner network. Here, the inner network becomes a subroutine called from a conventional outer network that includes complex neurons with parameters that are shared across all layers and all nodes of a given cell type. The example embodiment is described by taking a multivariate nonlinear activation function having a plurality of inputs and at least one output as an example. In the multivariate nonlinear activation function, multiple arguments refer to different linear weighted sums of features and may correspond to distinct inputs such as apical and basal dendrites. The inner network constructor 210 may construct the inner network by modeling the multivariate nonlinear activation function using a multiplayer perceptron (MLP) having a plurality of inputs and at least one output terminal. The inner network constructor 210 may construct the inner network using a convolution of a preset size.

In operation 320, the model trainer 220 may train a combination model generated by merging the constructed with the outer network. The model trainer 220 may merge the constructed inner network and the outer network by providing the constructed inner network between hidden layers of the outer network. For example, the model trainer 220 may merge the constructed inner network with an arbitrary outer network such as a recurrent network and a residual network. The model trainer 220 may merge the constructed inner network and the outer network through a slice and concatenation operation from a depth dimension before and after the inner network. An operation of merging the inner network and the outer network is described with reference to FIG. 5. Hereinafter, an entire neural network in which the inner network and the outer network are merged is referred to as the combination model.

Also, the model trainer 220 may pretrain the inner network by applying supervised learning to the multivariate nonlinear activation function. The model trainer 220 may simultaneously train the inner network and the outer network to generate the combination model by merging the pretrained inner network and the outer network through parameter sharing. The model trainer 220 may fix the trained inner network and then initialize the trained outer network, and may retrain the initialized outer network. Such a training operation is described with reference to FIG. 6.

FIG. 5 illustrates an example of an architecture of merging an inner network and an outer network according to an example embodiment. To define a multivariate nonlinear activation function, the inner network and the outer network are described.

The inner network may learn an arbitrary multivariate nonlinear activation function having a plurality of inputs and at least one output. The multivariate nonlinear activation function may replace a general scalar activation function, such as rectified linear unit (ReLU). The outer network refers to the rest of a model architecture aside from the nonlinear activation function. A framework that includes two disjoint networks is flexible and general since diverse neural architectures, such as an MLP, a convolutional neural network (CNN), ResNets, etc., may be used as the outer network. On the other hand, an MLP having two hidden layers with 64 units followed by ReLU nonlinearity is used for the inner network. The MLP may be shared across all layers, analogous to a fixed canonical nonlinear activation function commonly used in a feedforward deep neural network. When testing a CNN-based outer network, a 1×1 convolution instead of the MLP is used for the inner network to make the combination model fully convolutional, but the inner network is otherwise essentially the same as a two-layer MLP. In this framework, the 1×1 convolution implies that the input to the inner network is a channel-wise feature.

Figure 5A:
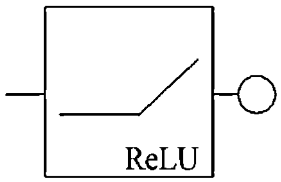
FIG. 5A illustrates an example of a mechanism of merging an inner network and an outer network according to an example embodiment.
Figure 5A:
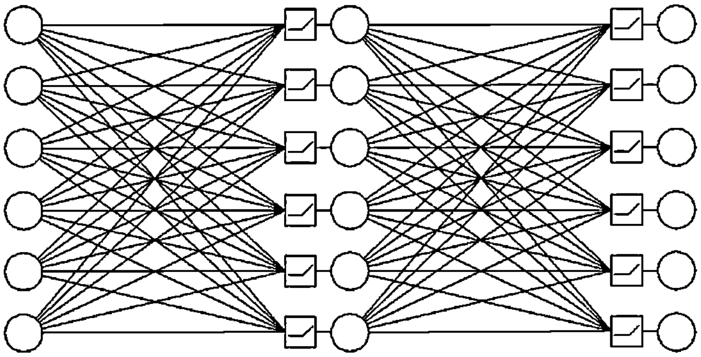
Figure 5B:
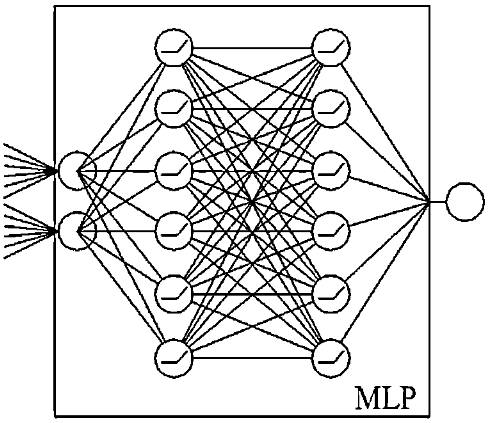
FIG. 5B illustrates an example of a mechanism of merging an inner network and an outer network according to an example embodiment.
Figure 5B:
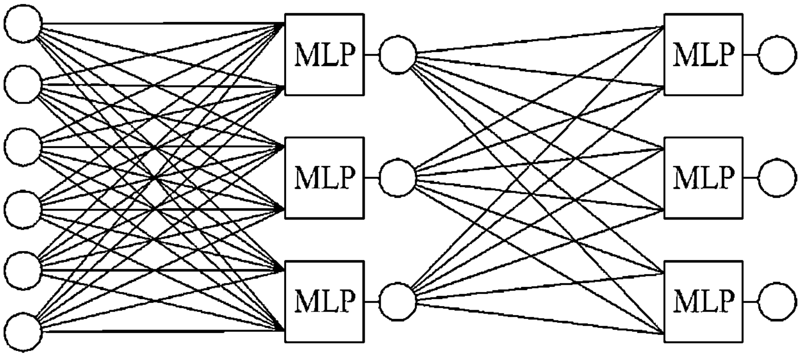
Figure 5C:
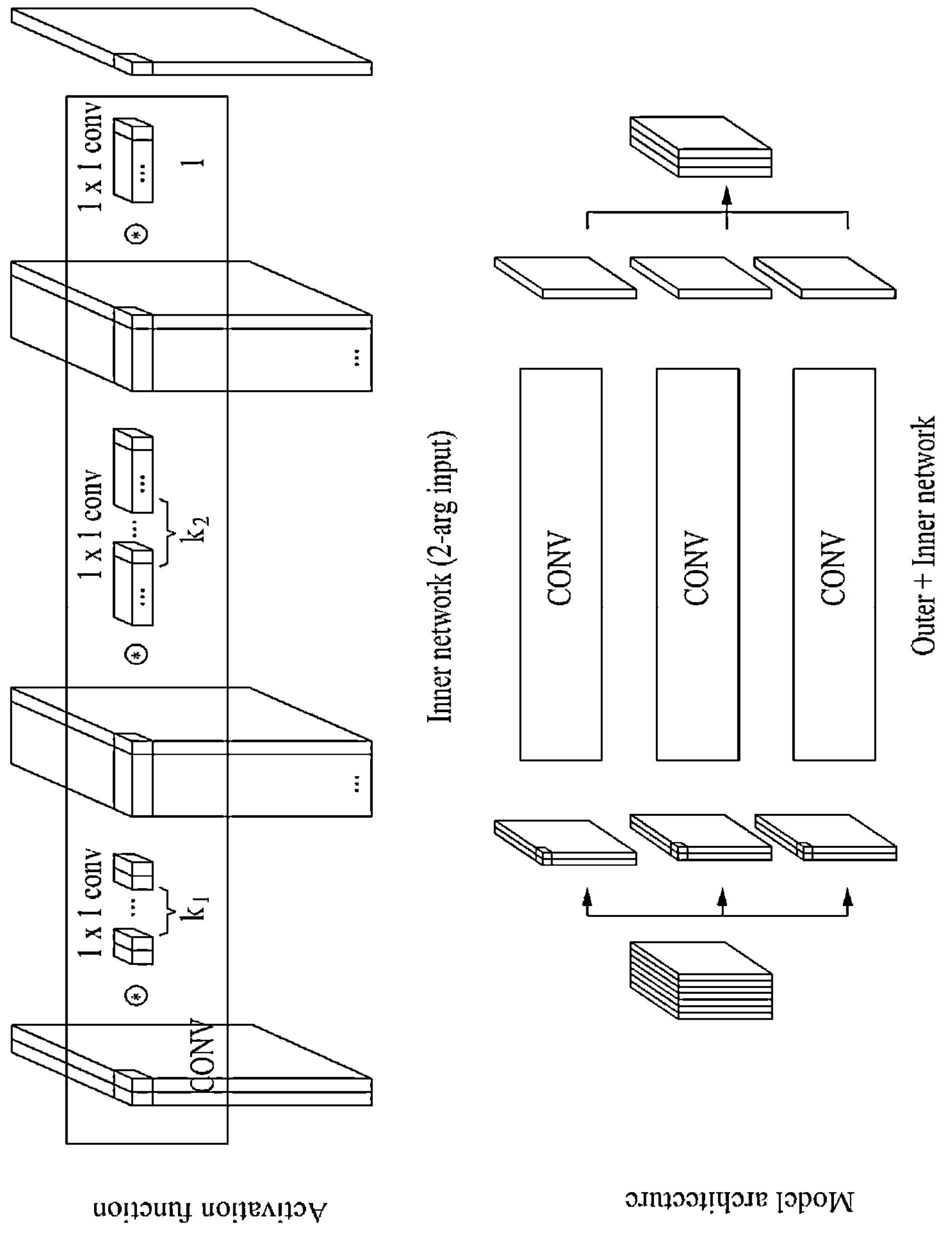
FIG. 5C illustrates an example of a mechanism of merging an inner network and an outer network according to an example embodiment.

A method of merging the multivariate nonlinear activation function with the outer network may be compared and explained with reference to FIG. 5. In FIG. 5, the nonlinear activation function is identified with a box and a rest excluding the box represents an element of the outer network. FIG. 5A illustrates modularization of the existing ReLU function and, here, the modularized ReLU function is merged with an MLP-based outer network with a nonlinear activation function. FIG. 5B illustrates an MLP-based inner network (n=2) having a plurality of input arguments merged with an MLP-based outer network. Here, the inner network having the existing ReLU function may be replaced with the MLP-based inner network having the plurality of input arguments. FIG. 5C illustrates a 1×1 convolution-based inner network merged with a convolution-based outer network. The inner network takes inputs from various feature maps. The convolution-based outer network requires a slice and concatenation operation from a depth dimension before and after the inner network.

FIG. 6 illustrates an operation of training a combination model configured with an inner network and an outer network according to an example embodiment.

Figure 6A:
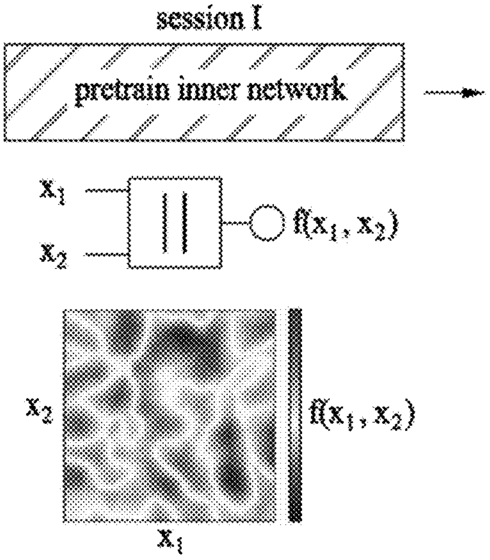
FIG. 6A illustrates an example of an operation of training a combination model configured with an inner network and an outer network according to an example embodiment.
Figure 6B:
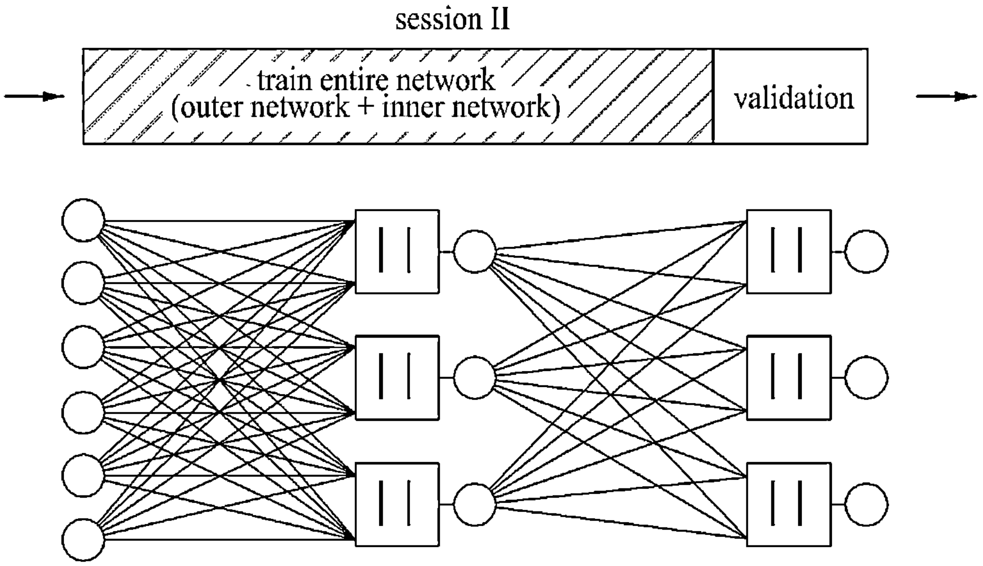
FIG. 6B illustrates an example of an operation of training a combination model configured with an inner network and an outer network according to an example embodiment.
Figure 6C:
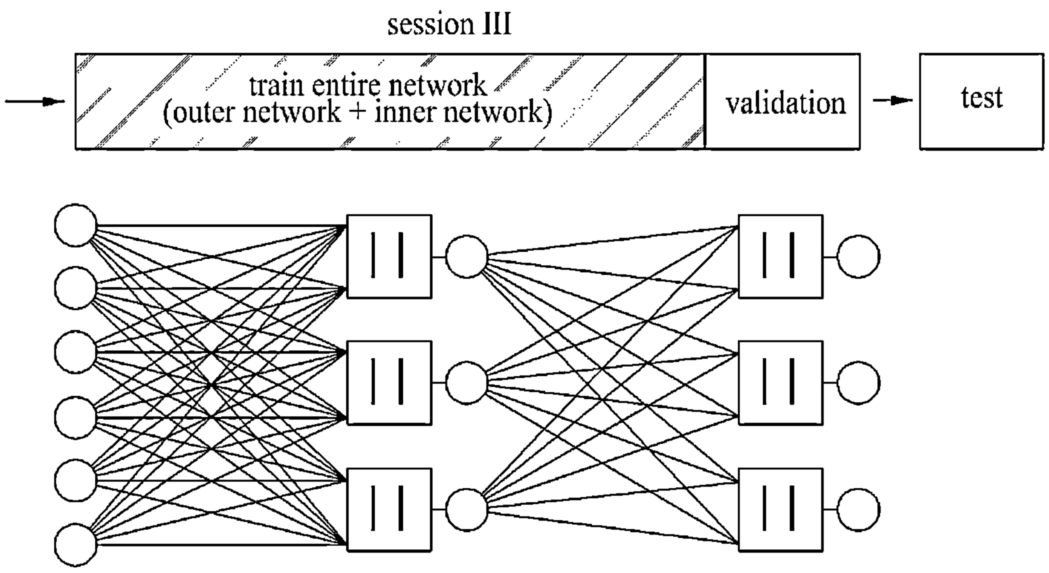
FIG. 6C illustrates an example of an operation of training a combination model configured with an inner network and an outer network according to an example embodiment.

Pretraining (session 1), training of inner and outer networks (session 2), and training of an outer network for a fixed inner network (session 3) may be performed. FIG. 6A relates to pretraining and illustrates a multivariate inner network trained to predict a smoothed random initial activation map, FIG. 6B illustrates an example of simultaneously training an inner network and an outer network, and FIG. 6C illustrates an example of retraining an outer network with a fixed inner network.

A pretraining operation (FIG. 6A) is described. Initially, a random initial nonlinear activation function is generated and the inner network may be pretrained using supervised learning. To start with a sufficiently complex initial nonlinear activation function, a piecewise constant random output sampled uniformly from [−1, 1] may be generated over a 5×5 grid of unit squares tiling an input space. Output may be blurred by a 2D Gaussian kernel ($\sigma$=3 units) to define a randomly smoothed activation map. The nonlinear activation function serves as a target for the inner network to match (FIG. 6A). An example of the pretrained multivariate nonlinear activation function is illustrated in FIG. 6B. This produces an initialized inner network of which parameters are transferred to a next phase of training.

An inner and outer network training operation (FIG. 6B) is described. The pretrained inner network may be merged with the outer network through parameter sharing. For example, a combination model in which the inner network and the outer network are merged may be applied to an image classification operation. The inner network and the outer network are simultaneously trained such that the combination model may learn over what might be analogous to an evolutionary timescale on which nonlinear cell properties emerge. The outer network may use an MLP that has three hidden layers with a plurality of (e.g., 64) units or a CNN that has four convolutional layers (with [60, 120, 120, 120] kernels of size 3×3 and a stride of 1, using 2×2 max-pooling with a stride of 2). Aside from the MLP or the convolutional layer, the outer network may use other standard architectural components, that is, layer normalization, dropout, and the like.

Figure 7A:
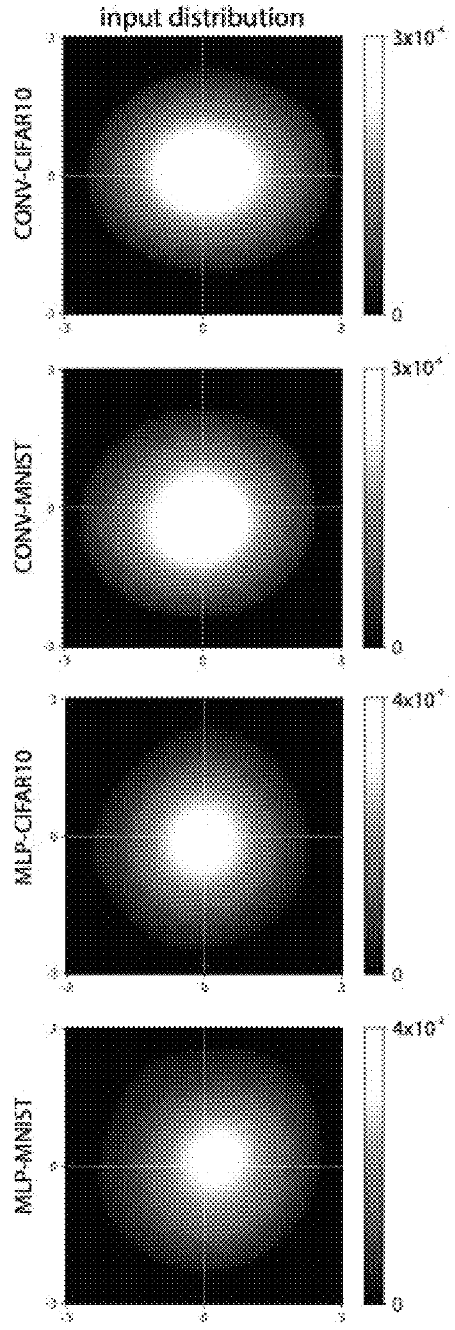
FIG. 7A illustrates an example of results of a learned multivariate activation function according to an example embodiment.
Figure 7B:
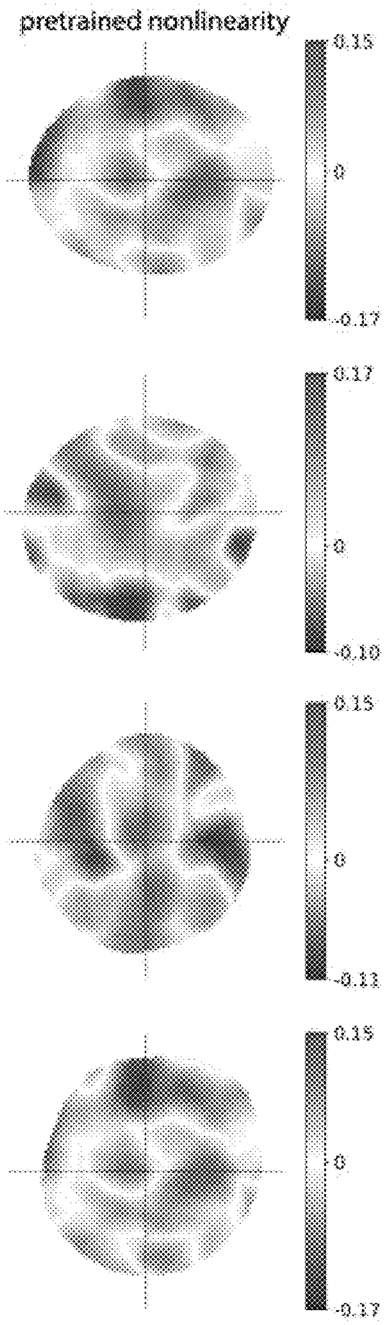
FIG. 7B illustrates an example of results of a learned multivariate activation function according to an example embodiment.
Figure 7C:
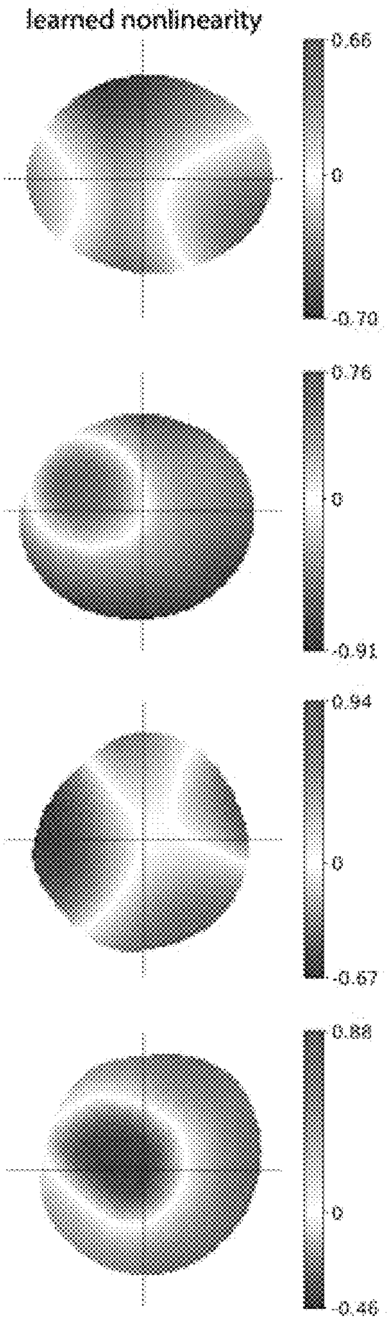
FIG. 7C illustrates an example of results of a learned multivariate activation function according to an example embodiment.

As described above, the combination model may be trained on MNIST and CIFAR-10 datasets using ADAM with a learning rate of 0.001 until a validation error saturates. Early-stopping may be used with a window size of 20. The learned multivariate nonlinear activation function $f_{inner-net}(\bullet)$ may be frozen at the time of saturation or at a maximum epoch. FIG. 7C illustrates an example of the learned multivariate nonlinear activation function.

FIG. 7 illustrates an example of results of a learned multivariate nonlinear activation function according to an example embodiment. FIG. 7A illustrates an example of an input distribution, FIG. 7B illustrates an example of a pretrained random initial activation function, and FIG. 7C illustrates an example of different learned multivariate nonlinear activation functions (a convolution-based inner network and an MLP-based inner network) trained on two different datasets CIFAR-10 and MNIST. Shadows represent the output of activation function masked to a best-trained part of the input distribution, that is, for 99% of most common input values. FIG. 7D shows that the inner network having the multivariate nonlinear activation function may learn faster than other networks.

To obtain intuition about the learned multivariate nonlinear activation function, values of every input to the nonlinear activation function of the inner network may be collected over all test data at inference time. For display, the input distribution of the pre-nonlinear activation function ((FIG. 7A) may be computed and the nonlinear activation function over a region enclosing 99% of the input distribution is shown ((FIG. 7C).

The outer network training operation (FIG. 6C) for the fixed inner network is described. As the multivariate nonlinear activation function is learned, the inner network may be fixed and the outer network may be retrained to use the outer network for new task data. In the parameter learned in the aforementioned session 2, the outer network may be initialized again by fixing the inner network by borrowing $f_{inner-net}(\bullet)$ learned from session 2. Here, only the outer network may be trained such as generally training a deep neural network having a standard nonlinear activation function. A training curve of session 3 may not be different from what is observed in session 2 (FIG. 7D), which represents that most of learning over long time epochs is attributable to a change of parameters in the outer network. That is, learning of the multivariate nonlinear activation function may be terminated in an early stage and the rest of learning may be dedicated to solving tasks.

Figure 8A:
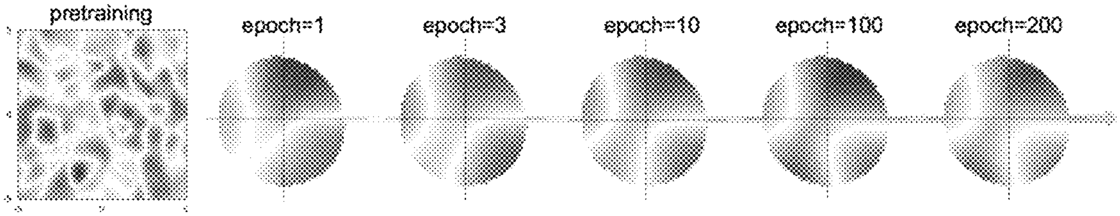
FIG. 8A illustrates an example of a process of a learned multivariate activation function that develops into a two-dimensional (2D) spatial pattern according to an example embodiment.
Figure 8B:
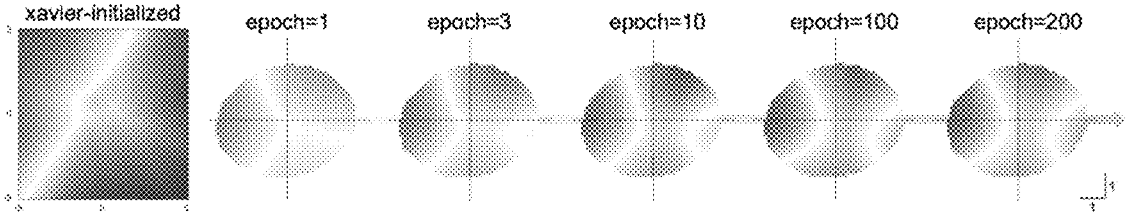
FIG. 8B illustrates an example of a process of a learned multivariate activation function that develops into a two-dimensional (2D) spatial pattern according to an example embodiment.

The evidence of structural stability of the inner network may be found by constructing the learned multivariate nonlinear activation function for each epoch in session 2. Referring to FIG. 8, it can be verified that the multivariate nonlinear activation function matures, that is, develops into a typical 2D spatial pattern within 1-5 epochs. This suggests that the overall spatial structure of the activation function emerges quite rapidly from pressure that arises early in a learning process.

According to an example embodiment, an inner network and an outer network may perform a given artificial intelligence (AI) task and, at the same time, may be independently trained.

Comparison to other nonlinear activation functions will be made to explain XOR learning probability of a multivariate nonlinear activation function according to an example embodiment and a practical application method thereof.

Figure 9A:
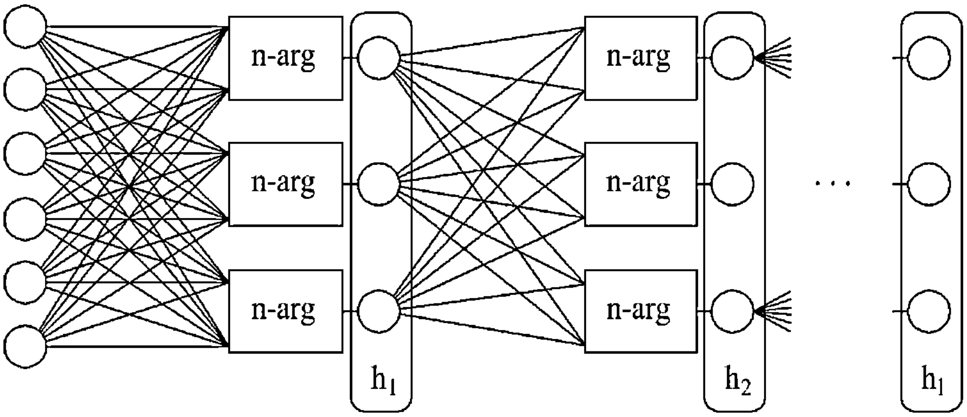
FIG. 9A illustrates an example of an architecture of a baseline model for a parameter count according to an example embodiment.
Figure 9B:
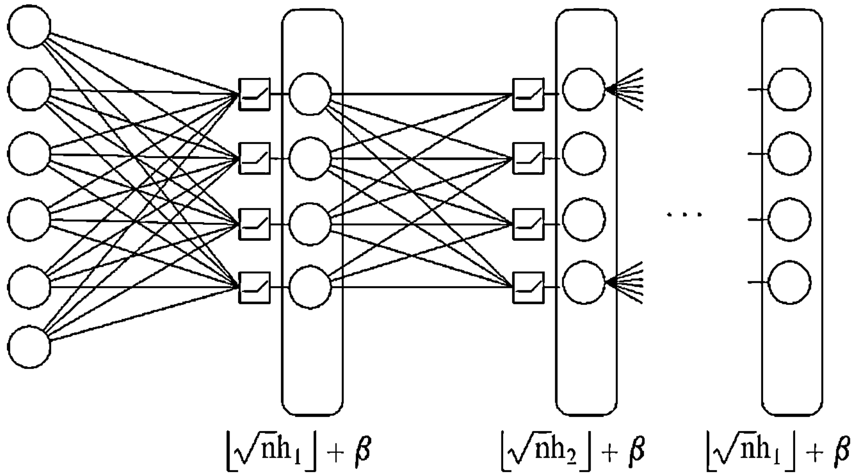
FIG. 9B illustrates an example of an architecture of a baseline model for a parameter count according to an example embodiment.

The multivariate nonlinear activation function proposed in the example embodiment may be compared to a conventional single-argument-based nonlinear activation function. For fair comparison, a baseline model of FIG. 9 may be trained such as training the outer network. FIG. 9A illustrates an MLP-based outer network having L hidden layers with $h_\ell$ units along with a multivariate nonlinear activation, and FIG. 9B illustrates a baseline model architecture with ReLU that includes L hidden layers with $\lfloor \sqrt{n h_\ell} \rfloor + \beta$ units in each layer $\ell$. Here, the baseline model may include the same MLP or CNN architecture. That is the same type and the same number of outer network layers as that of the proposed combination model are used. When comparing a plurality of architectures, comparable numbers of learnable parameters need to be used in classification tasks by systematically adjusting the number of hidden units or the number of feature maps in each layer. Specifically, the MLP-based outer network FIG. 8A with the multivariate nonlinear activation function includes $$x(nh_1+1)+\sum_{\ell=1}^{L-1} nh_\ell h_{\ell+1}+h_L y+(65n+4288)$$

parameters. Here, x, y, and $h_\ell$ denote an input dimension, an output dimension, and the number of units in hidden layer $\ell$. The last term represents the number of inner network parameters. This is independent of the input and output dimensions as well as the number of hidden layers L and thus, does not increase the complexity of the combination model due to parameter sharing. In contrast, since the second term $\sum_{\ell=1}^{L-1} nh_\ell h_{\ell+1}$ dominates the parameter count, the baseline model (FIG. 9B) has L layers each including $\lfloor \sqrt{n h_\ell} \rfloor + \beta$ hidden units. Here, β denotes constant to approximate the parameter count of the proposed combination model ($\lfloor \sqrt{n h_\ell} \rfloor \times \lfloor \sqrt{n h_\ell} + 1 \rfloor \approx n h_\ell h_\ell + 1$). A method of matching the parameter count in the MLP-based outer network may apply to the CNN-based model by setting $h_\ell$ to be the number of feature maps in convolutional layer $\ell$ instead of hidden units.

According to an example embodiment, an inner network serves as a function approximator to make it possible to learn an arbitrary function pattern.

Figure 7D:
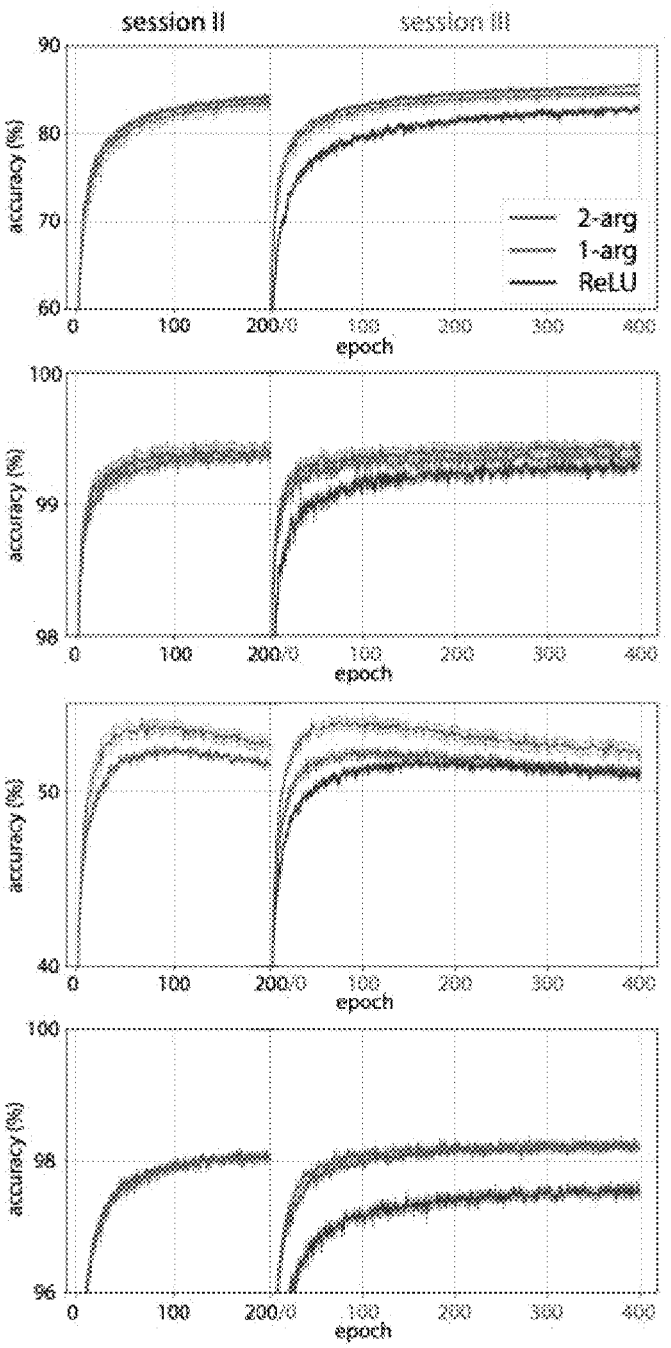
FIG. 7D illustrates an example of results of a learned multivariate activation function according to an example embodiment.

FIG. 7D illustrates an example of comparing training performance of a multivariate nonlinear activation function to a network using an ReLU or a single-argument-based nonlinear activation function. Training on MNIST and CIFAR-10 is performed four times, which may produce four different samples of model performance. Results of four samples are averaged and it can be verified that the inner network with the learned multivariate nonlinear activation function achieves the overall robust performance. In particular, the inner network with the multivariate nonlinear activation function learns faster ReLU network and achieves better asymptotic performance, which provides evidence for a better inductive bias in the inner network due to the learned multivariate nonlinear activation function.

FIG. 10 illustrates an example of a gating operation in a multivariate nonlinear activation function according to an example embodiment.

Four different attempts of training experiments are repeated and samples of the learned multivariate nonlinear activation function trained on MNIST and CIFAR-10 may be collected within outer networks (e.g., an MLP-based outer network and a CNN-based outer network). In FIG. 10A to FIG. 10D, each left column shows an example of the learned multivariate nonlinear activation function and each row represents a different repetition of the training experiment. In FIG. 10A to FIG. 10D, the learned multivariate nonlinear activation functions are reliably shaped like quadratic functions and vary by shift and/or rotation. All the examples show a nontrivial 2D structure that reflects interaction between two input arguments. The majority shows a (potentially rotated) white X shape, indicating a multiplicative interaction between input features and consistent with a gating interaction or soft XOR.

Figure 10A:
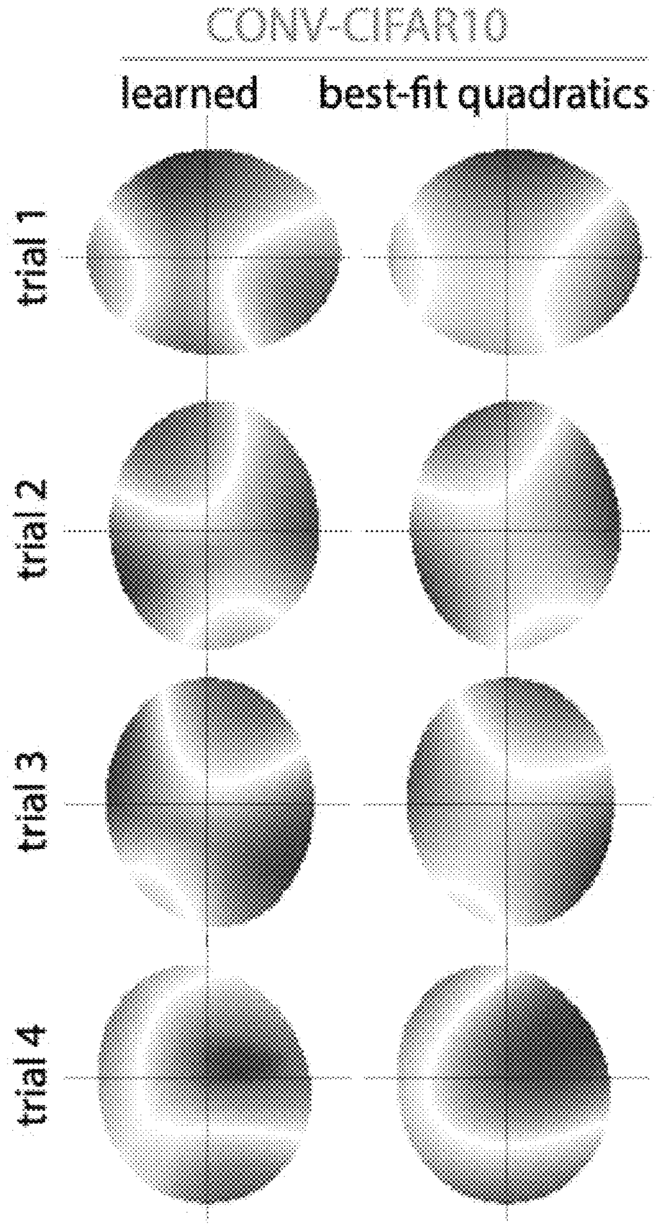
FIG. 10A illustrates an example of a gating operation in a multivariate nonlinear activation function according to an example embodiment.
Figure 10B:
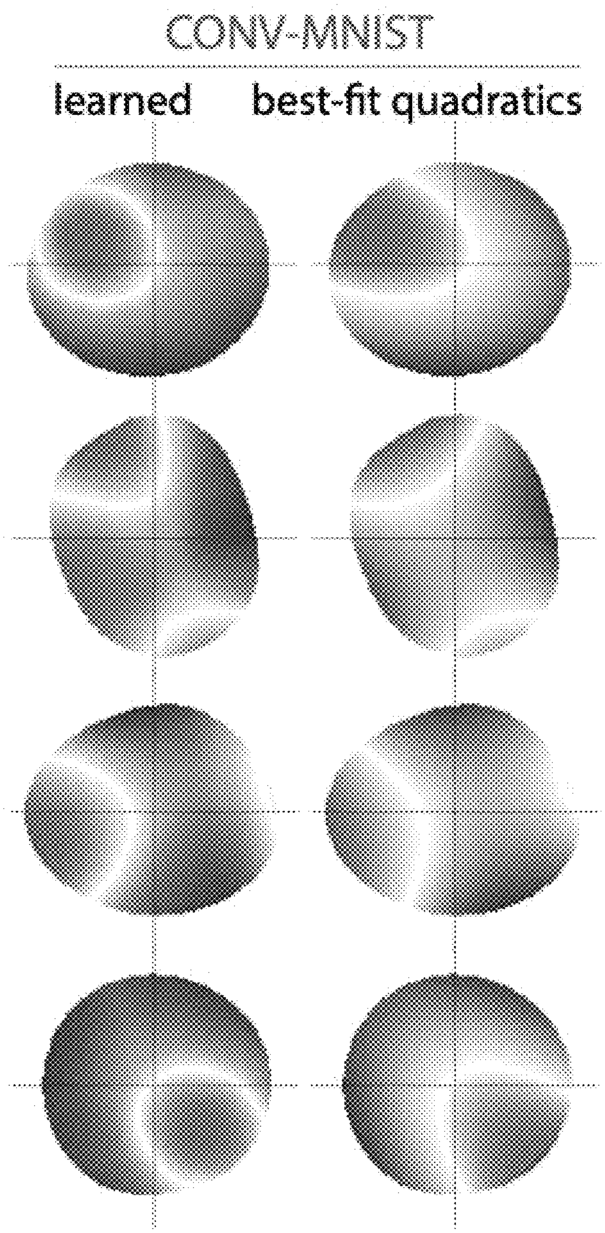
FIG. 10B illustrates an example of a gating operation in a multivariate nonlinear activation function according to an example embodiment.
Figure 10C:
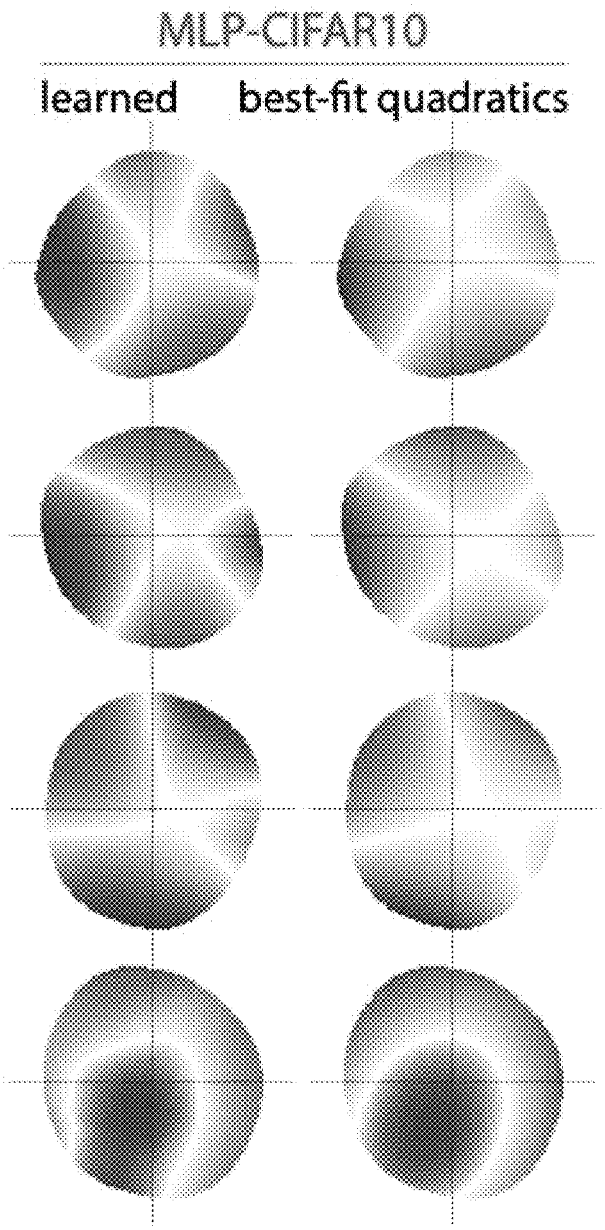
FIG. 10C illustrates an example of a gating operation in a multivariate nonlinear activation function according to an example embodiment.
Figure 10D:
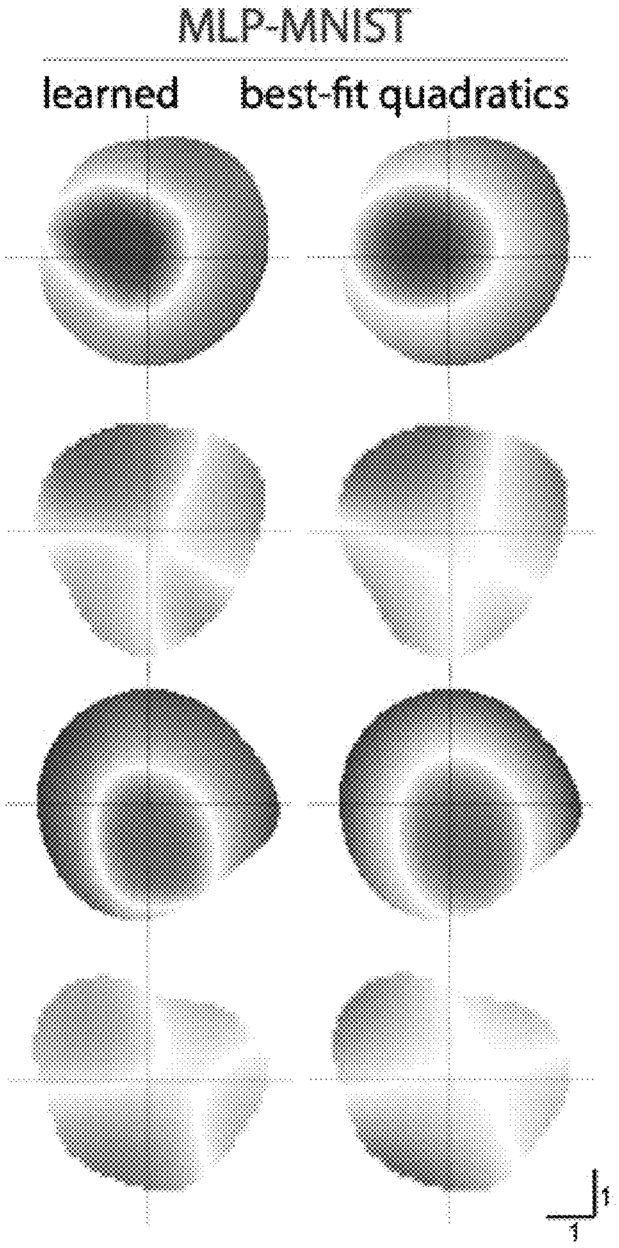
FIG. 10D illustrates an example of a gating operation in a multivariate nonlinear activation function according to an example embodiment.
Figure 10E:
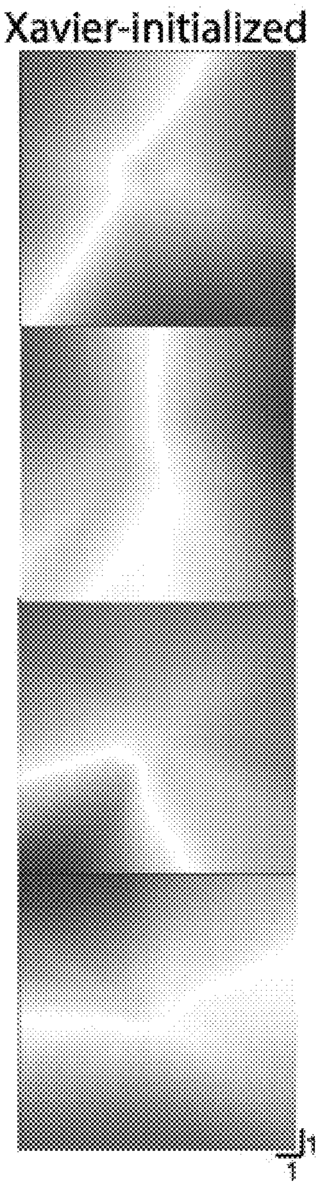
FIG. 10E illustrates an example of a gating operation in a multivariate nonlinear activation function according to an example embodiment.
Figure 10F:
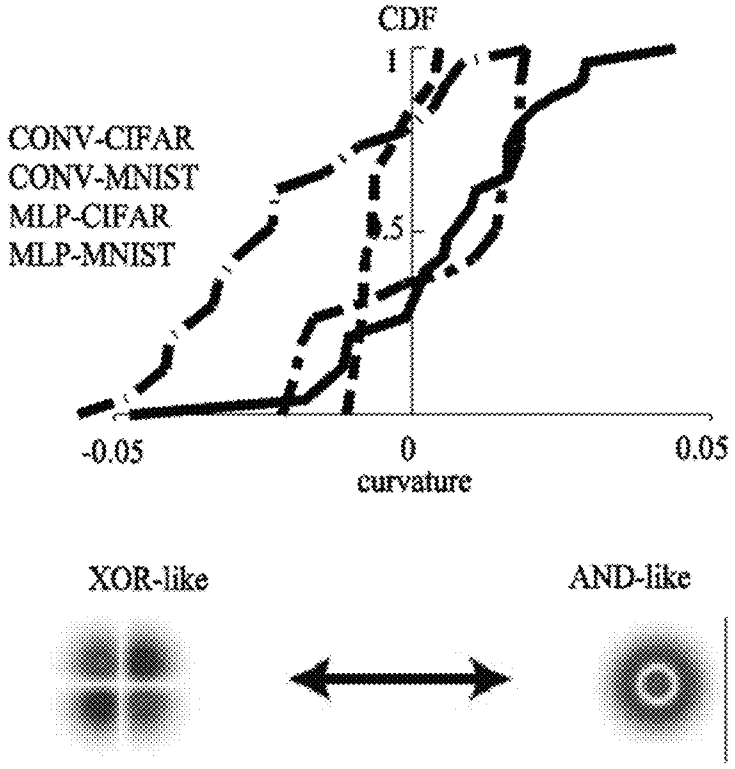
FIG. 10F illustrates an example of a gating operation in a multivariate nonlinear activation function according to an example embodiment.
Figure 10G:
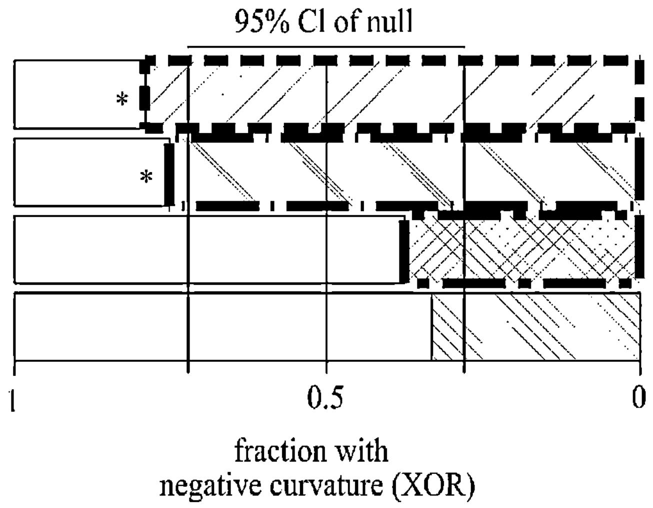
FIG. 10G illustrates an example of a gating operation in a multivariate nonlinear activation function according to an example embodiment.

In FIG. 10A to FIG. 10D, each right column shows best-fit quadratics corresponding to the learned multivariate nonlinear activation function of each corresponding left column. FIG. 10E illustrates a random activation function generated from Xavier weight initialization, FIG. 10F illustrates a cumulative distribution function (CDF) of nonlinear curvature, and FIG. 10G illustrates a fraction of nonlinearity with negative (XOR-like) curvature. Even a set of random functions may by chance have a nonzero average curvature.

An algebraic quadratic functional form $$f(x_1, x_2)=c_1x_1^2+c_2x_2^2+c_3x_1x_2+c_4x_1+c_5x_2+c_6$$

is fitted to the inner network having the learned multivariate nonlinear activation function and it can be verified that the learned multivariate nonlinear activation function and its best-fit quadratics have a significantly similar structure. This is the case even though spatial patterns have different rotations.

Specificity of observed inner network output responses may be validated. It can be verified by eye that a learned multivariate nonlinear activation function is substantially different from a nonlinear activation function generated by a random function (FIG. 7B and FIG. 7C). However, a regular pattern of the learned multivariate nonlinear activation function may also be obtained through popular network initialization methods, such as conventional Xavier weight initialization. Therefore, to differentiate between the two probabilities, the learned multivariate nonlinear activation function may be compared to the inner network initialized with the Xavier random initialization (FIG. 10E). It can be verified that the Xavier random initial activation, although not as "random" as that generated in the example embodiment (FIG. 7B), is far from the regular quadratic pattern observed in the learned multivariate nonlinear activation function (FIG. 10E). It suggests that the quadratic structure observed by evolving to display such a smooth quadratic pattern (FIG. 8B) is not captured by a standard weight initialization method, but is favored by an optimization process instead.

To test whether the learned quadratic function has a statistically significant sub-structure (e.g., hyperbolic vs. elliptical or negative vs. positive curvature), a curvature implied by the above quadratic form $$c_1c_2 - c_3^2/4$$

may be computed (FIG. 10F and FIG. 10G). The convolution-based inner network learned the multivariate nonlinear activation function with a negative curvature for both tasks, a total of 78% of 48 trials (p=0.007 according to a binomial null distribution with even odds of either curvature). This indicates a multiplicative interaction between input features and is consistent with a gating interaction or soft XOR. In contrast, the MLP-based inner network architecture produced more positive curvatures, but were not statistically significant (p=0.06 by the same test).

Figure 11:
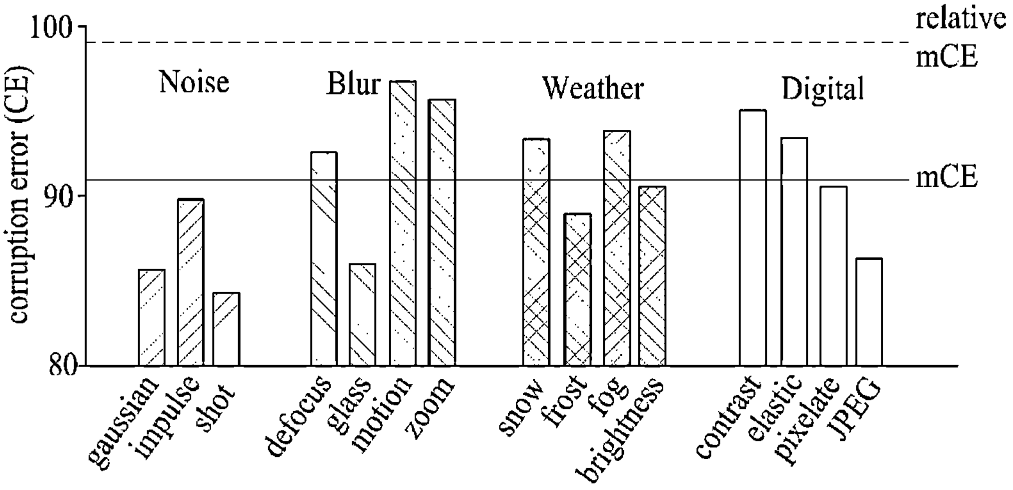
FIG. 11 illustrates an example of robustness of a multivariate nonlinear activation function against common image corruption according to an example embodiment.

FIG. 11 illustrates an example of robustness of a multivariate nonlinear activation function against common image corruption according to an example embodiment.

CIFAR-10-C may be designed to measure robustness of a classifier against common image corruption and includes 15 different corruption types applied to each CIFAR-10 validation image at five different severity levels. Here, the robustness performance on CIFAR-10-C may be measured by a corruption error (CE).

FIG. 11 illustrates a corruption error ((CE) bar), mCE (a black solid line), and a relative mCE (a black dashed line) of different corruptions on CIFAR-10-C and convolution-based outer network. Here, mCE represents the mean corruption error of corruptions in noise, blur, weather, and digital categories.

Referring to FIG. 11, it can be verified that a multivariate nonlinear activation function significantly improves the robustness over a ReLU baseline model (mCE=91.3%). mCE scores lower than 100 represents a more success in generalizing to a corrupted distribution than a reference model.

Also, the relative mCE (=99.5%, which is less than 100) shows that the accuracy decline of the proposed model in the presence of corruption is on average less than that of a network with ReLU. The results suggest that this corruption robustness improvement be attributable not only to a simple model accuracy improvement on a clean image but also a stronger representation of learnable multivariate nonlinear activation function than ReLU against natural corruption. Also, AutoAttack is carried out with an ensemble of four attacks to reliably evaluate adversarial robustness where hyperparameters of all attacks are fixed for all experiments across datasets and models. This method regards an attack as a success when at least one of the four attacks finds an adversarial example. Therefore, through computation of a difference in robustness between the inner network with the multivariate nonlinear activation function and the baseline model using the ReLU nonlinear function, it is possible to induce that the inner network with the multivariate nonlinear activation function shows greater robustness.

The technical effect on the XOR learning probability of the multivariate nonlinear activation function according to an example embodiment and the practical application method thereof may be described as follows. Since soft XOR may be interpreted as an output that selects one input dimension of its input and modulates or gates an output by another input dimension, it can be verified that a gating-like function automatically emerges from a learned multivariate nonlinear activation function. The inner network with such learned multivariate nonlinear activation function learns faster and becomes more robust.

Although the multivariate nonlinear activation function adds some complexity to the inner network, the number of parameters of the inner network is fewer since the parameters are shared across all neurons in the outer network. Also, using an algebraic polynomial approximation, the learned multivariate nonlinear activation function may reduce both the number of parameters and memory requirements of the inner network in practical applications.

The apparatuses described herein may be implemented using hardware components, software components, and/or a combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process; and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer methods and recorded in computer-readable media. The media may include, alone or in combination with program instructions, a data file, a data structure, and the like. The program instructions recorded in the media may be specially designed and configured for the example embodiments or may be known to one of ordinary skill in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of the program instruction may include a machine language code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made from the above description. For example, suitable results may be achieved if the described techniques are performed in different order, and/or if components in a described system, architecture, device, or circuit are combined in a different manner, and/or replaced or supplemented by other components or their equivalents. Therefore, other implementations, other example embodiments, and equivalents of the claims are to be construed as being included in the claims.

What is claimed is:

1. A learning method of an activation function performed by a computer device, the method comprising:

constructing an inner network using a multivariate nonlinear activation function, the inner network being configured to replace a scalar activation function of an outer network and operate as a subroutine called at nodes of the outer network; and training a combination model generated by merging the constructed inner network and the outer network having a plurality of layers, wherein the training of the combination model comprises:

pre-training the inner network using supervised learning to predict a smoothed random initial activation map;

simultaneously training the pre-trained inner network and the outer network to generate the combination model by merging the pre-trained inner network and the outer network through parameter sharing, parameters of the inner network being shared across all layers of the outer network; and fixing the trained inner network and then initializing the trained outer network, and retraining the initialized outer network.

2. The method of claim 1, wherein the constructing of the inner network comprises constructing the inner network by modeling the multivariate nonlinear activation function using a multilayer perceptron (MLP) having a plurality of input arguments and at least one output terminal.

3. The method of claim 1, wherein the constructing of the inner network comprises a convolution with a preset size.

4. The method of claim 1, wherein the training comprises merging the constructed inner network and the outer network by providing the constructed inner network between hidden layers of the outer network.

5. The method of claim 1, wherein the training comprises merging the constructed inner network and the outer network through a slice and concatenation operation from a depth dimension of the inner network.

6. A non-transitory computer-readable recording medium storing a computer program to perform the learning method of the activation function of claim 1 on the computer device.

7. A computer device comprising:

at least one memory storing instructions, and at least one processor, when executing the instructions, is configured to:

construct an inner network using a multivariate nonlinear activation function, the inner network being configured to replace a scalar activation function of an outer network and operate as a subroutine called at nodes of the outer network; and train a combination model generated by merging the constructed inner network and the outer network having a plurality of layers, wherein the training the combination model comprises:

pre-training the inner network using supervised learning to predict a smoothed random initial activation map;

simultaneously training the pre-trained inner network and the outer network to generate the combination model by merging the pre-trained inner network and the outer network through parameter sharing, parameters of the inner network being shared across all layers of the outer network; and fixing the trained inner network and then initialize the trained outer network, and retrain the initialized outer network.

8. The computer device of claim 7, wherein the at least one processor is further configured to construct the inner network by modeling the multivariate nonlinear activation function using a multilayer perceptron having a plurality of input arguments and at least one output terminal.

9. The computer device of claim 7, wherein the at least one processor is further configured to merge the constructed inner network and the outer network by providing the constructed inner network between hidden layers of the outer network.

* * * * *